United States Patent [19]

Dill

[11] 4,161,677
[45] Jul. 17, 1979

[54] MATERIAL FLOW STOPPAGE DETECTOR DEVICE

[75] Inventor: Terry A. Dill, Keota, Iowa

[73] Assignee: The Jefferson Industries Company, Fairfield, Iowa

[21] Appl. No.: 905,275

[22] Filed: May 12, 1978

[51] Int. Cl.² ............................................. G05D 7/00
[52] U.S. Cl. ...................................... 318/482; 222/56
[58] Field of Search ................ 307/116, 118; 318/474, 318/481, 482; 340/608, 610, 616, 617; 222/56, 64

[56] References Cited

U.S. PATENT DOCUMENTS

| 649,702 | 5/1900 | Moulton | 340/616 |
|---|---|---|---|
| 1,239,315 | 9/1917 | Stine | 340/608 X |
| 2,619,906 | 12/1952 | Gardenhour | 318/482 X |
| 3,253,745 | 5/1966 | Skelton | 222/56 |
| 3,831,159 | 8/1974 | Parsons | 340/617 |

Primary Examiner—Gene Z. Rubinson
Assistant Examiner—W. E. Duncanson, Jr.
Attorney, Agent, or Firm—Rudolph L. Lowell; G. Brian Pingel

[57] ABSTRACT

A flow stoppage detector device for a particulate material supply line includes a housing that has a pivoted partition member for dividing the housing into first and second adjacent upright conduit sections. The partition member has a pair of leg members and is pivotally disposed in the housing for movement to a first position in which a first leg member forms a common wall for the conduit sections and the second leg member an obstruction to a material flow through the second conduit section. A switch means on the housing has a switch actuator extended into the second conduit section for movement from a first position to a second position in response to an overflow of material over the common wall from the first conduit section into the second conduit section.

10 Claims, 6 Drawing Figures

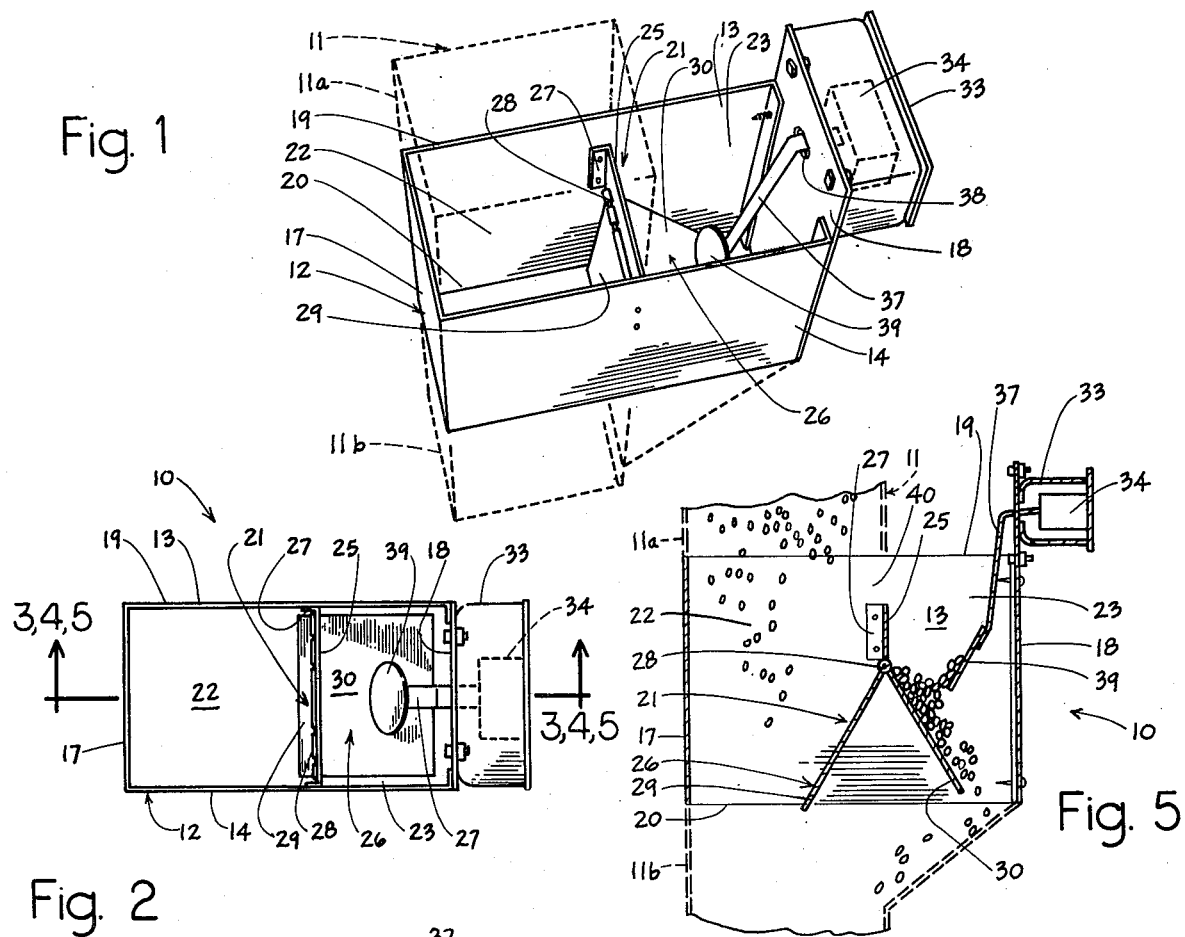
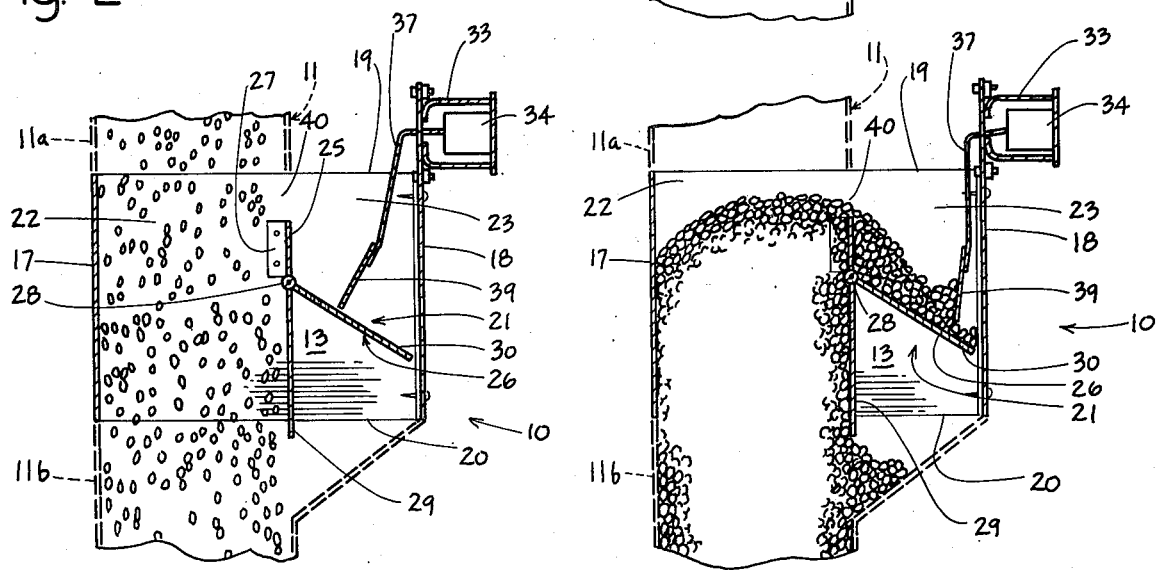
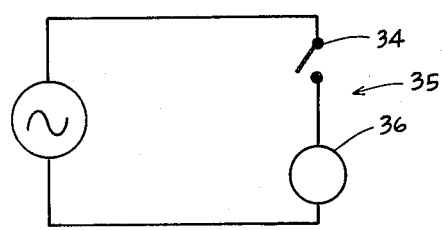

MATERIAL FLOW STOPPAGE DETECTOR DEVICE

BACKGROUND OF THE INVENTION

1. Field of the Invention

The present invention relates in general to flow stoppage detectors for particulate material supply lines and, more specifically, to such detectors that are adapted to stop a further delivery of material to the supply line when the supply line becomes obstructed.

2. Description of the Prior Art

Various prior art devices have been employed in association with a supply line for monitoring the flow of material through the line as exemplified by U.S. Pat. No. 2,907,015; Jackson, U.S. Pat. No. 2,654,879; Waters, et al., U.S. Pat. No. 2,561,763; Bogot, et al., U.S. Pat. No. 2,659,881 and Donner, U.S. Pat. No. 410,502. The above patents disclose devices having electrical switch means with switch arms disposed in the normal path of the flow of material, and all of the devices, except that of Donner, operate in direct response to such flow. The Donner device operates in response to a back-up of material in the supply line to actuate a switch arm and sound an alarm.

Although the above devices appear to be useful for their intended purposes, mounting of a switch arm in the direct flow path of material in the supply line is highly undesirable since the switch arm is continuously acted upon by the material flow and is difficult to maintain free from dust and contaminates that collect thereon from the material flow.

SUMMARY OF THE INVENTION

The present invention provides a flow stoppage detector device for a particulate material supply line that has a housing divided into first and second conduit sections by a pivotally movable partition means having a first leg member that normally serves as a common side wall of the conduit sections and a second leg member that obstructs any flow of material in the second conduit section. The upper portion of the first conduit section is open to the upper portion of the supply line. The upper ends of the conduit sections are open to each other at positions above the second leg member of the partition means and their lower ends are open to the lower portion of the supply line below the second leg member of the partition means. The first conduit section receives material from an upper portion of the supply line and directs it through the detector device to a lower portion of the supply line. The second conduit section is associated with a switch means that controls the operation of a material feed motor associated with a conveyor or the like which delivers the material to the supply line. The switch means includes an actuator or switch arm arranged in the second conduit section so as to be isolated from the normal flow of material through the first conduit section of the detector device.

When an obstruction to the flow of material occurs in the lower supply line portion, the material piles up therein and backs into and fills the first conduit section of the detector device. When this occurs, material from the first conduit section flows over the second leg member of the partition means into the second conduit section thereby moving the switch arm and actuating the switch means to stop the feed motor.

The feed motor is maintained in the stopped or off condition until the obstruction in the lower portion of the supply line is removed and the supply line and first conduit section of the detector device are substantially free of material. At such time, the partition means pivots to unblock the second conduit section so that material therein flows into the lower supply line portion. Only then is the switch means actuated to energize the feed motor to an 'on' condition. Thus, the detector device of the present invention not only provides means for turning the material feed motor off when a flow stoppage in the material supply line occurs, but also provides a time delay between the clearance of material from the line and the turning on of the feed motor.

BRIEF DESCRIPTION OF THE DRAWINGS

FIG. 1 is a perspective view of a preferred embodiment of the flow stoppage detector device of the present invention shown in association with upper and lower portions of a material supply line;

FIG. 2 is a reduced plan view of the detector of FIG. 1;

FIG. 3 is a sectional view taken on line 3—3 of FIG. 2 showing a normal flow of material through the supply line and the detector device;

FIG. 4 is illustrated similarly to FIG. 3 and shows a pile-up of material that occurs in a conduit section of the detector device when the lower portion of the supply line is obstructed;

FIG. 5 is illustrated similar to FIG. 4 and shows the detector device being cleared of material to provide for a normal material flow therethrough; and FIG. 6 is a schematic diagram of an electrical circuit that is controlled by the detector device of FIG. 1.

DESCRIPTION OF THE PREFERRED EMBODIMENT

The present invention is adapted to detect a flow stoppage of a particulate material, such as grain, in a supply line due to an obstruction in the line. A preferred embodiment of the detector device of the invention is indicated generally at 10, in FIG. 1, in association with a supply line 11 having upper and lower portions 11a and 11b, respectively, indicated by dashed lines in FIG. 1.

Referring now to both FIGS. 1 and 2, the detector device 10 is preferably formed from metal and includes a box like housing 12 of a rectangularly shape in transverse cross section. The housing 12 has side walls 13 and 14, end walls 17 and 18 and an open top and bottom 19 and 20, respectively. A partition means 21 extends between the side walls 13 and 14 to divide the interior of the housing 12 into a first conduit section 22, and a second conduit section 23.

The partition means 21 is comprised of an upright mounting bracket member 25 and a lower gate portion 26 of a V-shape in transverse cross section. The bracket 25 has end flanges 27 secured to approximately the longitudinal centers of the side walls 13 and 14 such that the bracket 25 is substantially parallel to the end walls 17 and 18 and spaced downwardly from the open housing top end 19. The gate or bell crank portion 26 has planar leg members 29 and 30 having a junction or apex hingedly suspended from the mounting bracket 25. When the housing is substantially free of any material the partition means is swingable by the action of gravity to the position shown in FIGS. 1 and 2.

Mounted on the upper portion of the outer surface of the housing end wall 18 is an electrical safety box 33 for a switch unit 34. The switch unit 34 is a typical two position switch that is normally closed and forms part of an electrical circuit 35, (FIG. 6) for controlling the operation of a feed motor 36 that is associated with a conveyor or the like (not shown) for delivering the particulate material to the supply line 11. The switch unit 34 includes a switch arm or actuator 37 that projects from the switch box 33 and through an opening 38 in the housing side wall 18 downwardly and inwardly into the conduit section 23 with its terminal end adjacent the upper surface of the leg member 30. A disk or sail member 39 is fixed on the terminal or free end of the arm 37 for a purpose to appear later.

The first conduit section 22 is in alignment with the upper supply line portion 11a and the entire bottom 20 of the housing 12 is open to the lower supply line portion 11b so that the normal flow of material supplied by operation of the feed motor 36 is through the upper supply line portion 11a, the first housing conduit section 22 and the lower supply line portion 11b, as indicated by FIG. 3. As a result of such flow, the gate portion 26 of the partition member 21 is pivoted toward the housing end wall 18 to a first position wherein the gate leg member 29 is substantially parallel to the housing end wall 17 to form a common side wall between the conduit sections 22 and 23, and the gate leg member 30 protrudes into and obstructs the flow of any material through the second conduit section 23.

During a normal material flow operation, no material flows through the second conduit section 23. However, when an obstruction occurs in the lower supply line portion 11b so as to stop any material flow therethrough, material piles up in the line portion 11b, and the first conduit section 22. As previously described, the partition means 21 is disposed below the housing upper end 19 so as to form an opening 40 between the conduit sections 22 and 23. As a result when the piled-up material reaches the top of the partition means 21, it overflows into the second conduit section 23 through the opening 40 onto the top of the leg member 30 and against the switch arm 37, as indicated by FIG. 4. The material overflowing into the conduit section piles up against the sail 39 on the switch arm 37 and moves the arm from its normally downwardly and inwardly inclined position to a substantially vertical position wherein the switch unit 34 is actuated to open the electrical circuit 35 and turn the feed motor 36 to an off condition stopping any further supply of material into the line 11.

The material piled on top of the leg member 30 does not initially affect pivoted movement of the gate portion 26 due to the material that is backed-up in the conduit section 22. Consequently, the gate portion 26 is held in position with the leg member 30 blocking the conduit section 23 to maintain the feed motor 36 in an off condition. The detector device 10 thus serves to prevent a complete clogging of the supply line 11 when a material flow therein is obstructed to facilitate unclogging of the line 11 when the obstruction is removed, as will now be described.

When the obstruction in the lower supply line portion 11b is removed and the particulate material therein begins flowing, the material in the housing conduit section 22 drains into the supply line portion 11b. During this time, the material in the second conduit section 23 is temporarily restrained against flow downwardly therefrom by the gate leg member 30 so that the switch arm 37 is maintained in a substantially vertical position to prevent energization of the feed motor 36.

Flow of material from the second conduit 23 is not initiated until sufficient material in the first conduit section 22 is drained into the supply line portion 11b to provide for the weight of the material resting on top of the leg member 30 pivoting the gate portion 26 toward the end wall 17 and into the conduit section 22 as shown in FIG. 5. When this occurs, the material in the conduit section 23 passes into the lower line portion 11b and the switch arm 37, which is spring biased, is permitted to return to its normal position for closing the switch unit 34.

Thus, the detector device 10 functions to provide a delayed actuation of the feed motor 36 to insure that substantially all particulate material that was piled up in the supply line portion 11b and conduit section 22 has been drained therefrom prior to the feeding of any additional material to the line 11 by actuation of the feed motor 36. The detector device 10 thus provides for a highly efficient detecting of a flow stoppage of material in a supply line and the control of a switch unit in response to such flow stoppage, wherein the switch unit is isolated from the material flow and the dust and contaminates therein.

Although the invention has been described with respect to a preferred embodiment thereof, it is to be understood that it is not to be so limited since changes and modifications can be made therein which are within the full intended scope of this invention as defined by the appended claims.

I claim:
1. A flow stoppage detector device for a particulate material supply line comprising:
  (a) a housing having:
    (1) first and second adjacent upright conduit sections,
    (2) a pivoted partition means in said housing comprising a first leg member movable to a first position to form a common side wall for said conduit sections and a second leg member arranged in a position to obstruct flow of material in one of said conduit sections when the first leg member is in the first moved position therefor, and
  (b) switch means on said housing having a switch actuator movable to a first position and a second position, said actuator, in one of the positions therefor, being adjacent the second leg member in the obstructing position therefor,
  (c) said particulate material, when the flow thereof through said first conduit section is obstructed, overflowing said common side wall into said second conduit section, to move said switch actuator from one position to the other position therefor.

2. A flow stoppage detector device according to claim 1, including:
  (a) an electrical motor for controlling the supply of material to said supply line,
  (b) an electrical circuit for said switch means and motor, and
  (c) said motor being in an off condition therefor when the switch actuator is moved to said second position.

3. A flow stoppage detector device according to claim 1, wherein:
  (a) said partition means is of a substantially inverted V-shape in transverse cross section having an apex, and (b) means on said housing hingedly connected to said apex to provide for pivotal movement of said partition means about an axis lying in the plane of said common wall.

4. A flow stoppage detector device for a particulate material supply line comprising:
(a) a housing having:
(1) a partition means pivotally disposed in said housing to divide said housing into:
(a) a first conduit means for receiving material from said supply line, and
(b) a second conduit means that has an upper portion open to said first conduit means,
(2) said partition means having a first leg member and a second leg member extended on an angle from said first member, and being pivotally movable from a first position in which said first leg member forms one of the side walls of said first conduit means and said second leg member blocks said second conduit means, to a second position in which said second conduit means is open to a flow of material therethrough, and
(3) switch means associated with said housing and having a switch arm disposed in said second conduit means and being movable from a first position to a second position to actuate said switch means when particulate material flows from said first conduit means into said second conduit means.

5. A flow stoppage detector device according to claim 4, wherein:
(a) a feed motor for supplying material to said supply line is controlled by said switch means and is actuated to an off condition when the switch actuator is moved to said second position.

6. A flow stoppage detector device according to claim 4, wherein:

(a) said partition means is of a substantially inverted V-shape in transverse cross section having an apex pivotally connected to said housing.

7. A flow stoppage detector device for a particulate material supply line comprising:
(a) a box type housing having:
(1) a first conduit means for receiving material from said supply line,
(2) a second conduit means having an upper portion open to said first conduit means,
(3) partition means of a substantially inverted V-shape in transverse cross section pivotally disposed in the housing to divide said housing into said first and second conduit means,
(b) switch means associated with said housing and having a switch actuator disposed in said second conduit means movable from a first position to a second position to actuate said switch means.

8. A flow stoppage detector device according to claim 7, wherein:
(a) said partition means is movable from a first position obstructing flow of material through said second conduit means to a second position in which said second conduit means is partially unobstructed.

9. A flow stoppage detector device according to claim 7, wherein:
(a) said switch actuator is disposed above the second leg member of said partition means for movement from said first position to said second position therefor in response to a flow of material from the first conduit means into the upper portion of said second conduit means.

10. A flow stoppage detector device according to claim 7, wherein:
(a) a feed motor for supplying material to said supply line is controlled by said switch means for actuation to an off condition when the switch actuator is moved to said second position.

* * * * *